US012675450B2

(12) United States Patent
Shetti et al.

(10) Patent No.: US 12,675,450 B2
(45) Date of Patent: Jul. 7, 2026

(54) REDUCED DOWNTIME FOR DATABASE MIGRATION TO IN-MEMORY DATABASE

(71) Applicant: SAP SE, Walldorf (DE)

(72) Inventors: Rahul Shetti, West Chester, PA (US); Prathyusha Garimella, Chester Spring, PA (US); Austin Valerian D'souza, West Chester, PA (US)

(73) Assignee: SAP SE, Walldorf (DE)

( * ) Notice: Subject to any disclaimer, the term of this patent is extended or adjusted under 35 U.S.C. 154(b) by 549 days.

(21) Appl. No.: 17/145,769

(22) Filed: Jan. 11, 2021

(65) Prior Publication Data

US 2021/0397590 A1     Dec. 23, 2021

Related U.S. Application Data

(60) Provisional application No. 63/042,931, filed on Jun. 23, 2020.

(51) Int. Cl.
| | |
|---|---|
| *G06F 16/21* | (2019.01) |
| *G06F 8/65* | (2018.01) |
| *G06F 9/54* | (2006.01) |
| *G06F 16/22* | (2019.01) |

(52) U.S. Cl.
CPC .............. *G06F 16/214* (2019.01); *G06F 8/65* (2013.01); *G06F 9/547* (2013.01); *G06F 16/2282* (2019.01)

(58) Field of Classification Search
CPC .......... G06F 16/214; G06F 8/65; G06F 9/547; G06F 16/2282; G06F 16/2358
See application file for complete search history.

(56) References Cited

U.S. PATENT DOCUMENTS

| | | |
|---|---|---|
| 8,356,010 B2 | 1/2013 | Driesen |
| 9,026,502 B2 | 5/2015 | Driesen et al. |
| 9,606,875 B2 | 3/2017 | Bushman |
| 9,881,035 B2 | 1/2018 | Engelko et al. |
| 10,929,415 B1 * | 2/2021 | Shcherbakov ...... G06F 3/04847 |
| | | 707/707 |
| 11,256,672 B1 * | 2/2022 | Daimler ................ G06F 16/182 |

(Continued)

OTHER PUBLICATIONS

"European Application Serial No. 201164673.2, Extended European Search Report mailed Sep. 17, 2021", 12 pgs.

*Primary Examiner* — Alexandria Y Bromell
(74) *Attorney, Agent, or Firm* — SCHWEGMAN LUNDBERG & WOESSNER, P.A.

(57) ABSTRACT

In an example embodiment, a solution is provided that selects a portion of a non-in-memory database to migrate prior to a database migration option (DMO) performing a downtime portion of the migration. While it is typically not possible for the entire database to be migrated prior to the downtime portion due to the need for certain portions of the database to be used for the DMO portion itself, a substantial portion of the non-in-memory database can be migrated prior to the DMO performing the downtime portion of the migration by using specialized techniques. By migrating a substantial portion of the database prior to the downtime portion, the size of the portion of the database that needs to be migrated during the downtime portion is reduced, thus substantially reducing the length of time needed for the downtime portion.

19 Claims, 9 Drawing Sheets

(56)        References Cited

U.S. PATENT DOCUMENTS

| | | |
|---|---|---|
| 2003/0130985 A1 | 7/2003 | Driesen et al. |
| 2010/0088281 A1 | 4/2010 | Driesen et al. |
| 2015/0006476 A1 | 1/2015 | Engelko et al. |
| 2016/0098443 A1 | 4/2016 | Specht et al. |
| 2016/0117375 A1 | 4/2016 | Antonopoulos |
| 2016/0170977 A1* | 6/2016 | Engelko ............... G06F 16/284 |
| | | 707/609 |
| 2018/0232382 A1 | 8/2018 | Mayer et al. |
| 2018/0246886 A1* | 8/2018 | Dragomirescu .... G06F 16/2379 |
| 2020/0236108 A1* | 7/2020 | Mital .................... H04L 63/306 |
| 2020/0356397 A1* | 11/2020 | Kumatagi ........... G06F 9/45558 |
| | | 707/707 |

* cited by examiner

FIG. 4

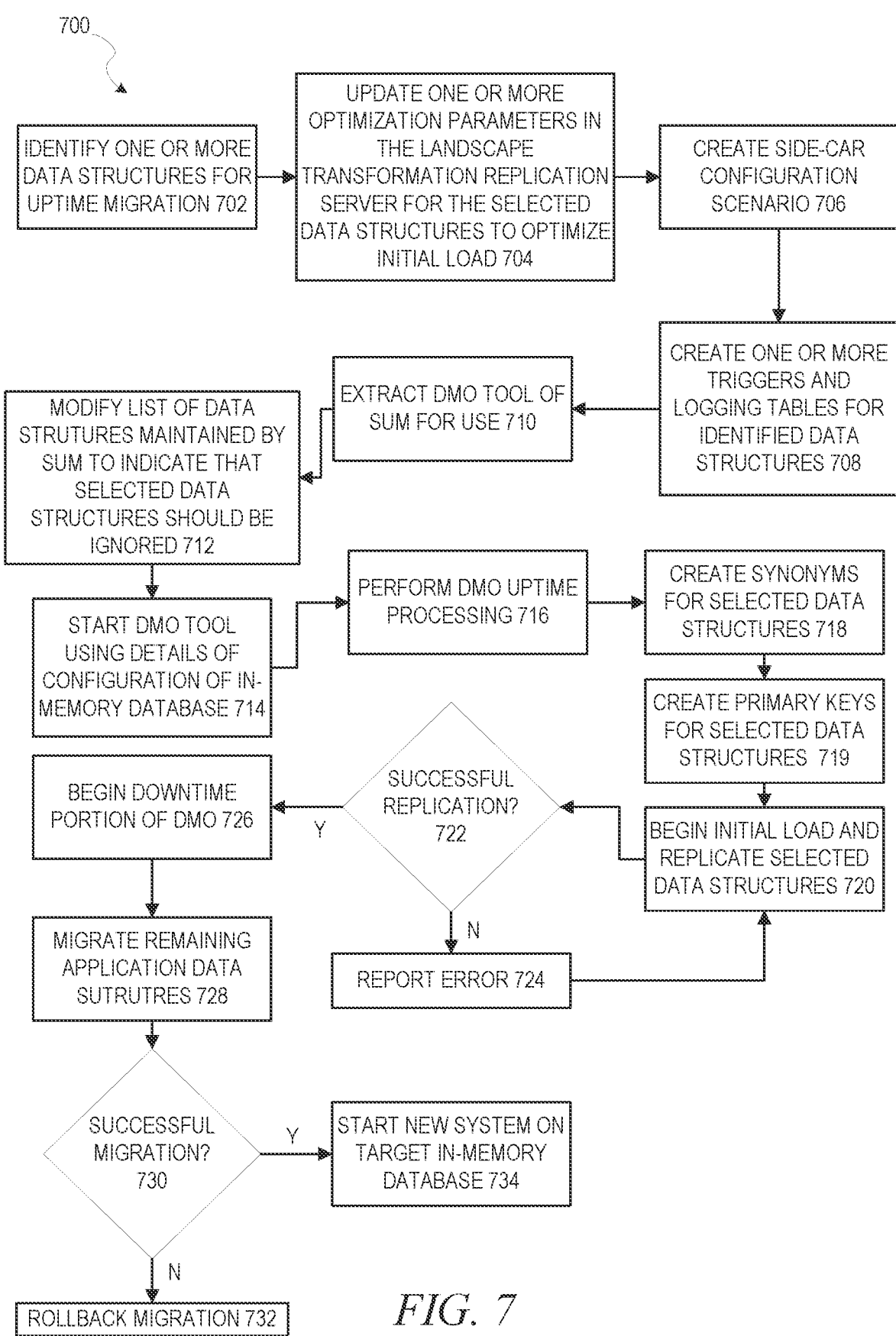

700

IDENTIFY ONE OR MORE DATA STRUCTURES FOR UPTIME MIGRATION 702

UPDATE ONE OR MORE OPTIMIZATION PARAMETERS IN THE LANDSCAPE TRANSFORMATION REPLICATION SERVER FOR THE SELECTED DATA STRUCTURES TO OPTIMIZE INITIAL LOAD 704

CREATE SIDE-CAR CONFIGURATION SCENARIO 706

CREATE ONE OR MORE TRIGGERS AND LOGGING TABLES FOR IDENTIFIED DATA STRUCTURES 708

EXTRACT DMO TOOL OF SUM FOR USE 710

MODIFY LIST OF DATA STRUTURES MAINTAINED BY SUM TO INDICATE THAT SELECTED DATA STRUCTURES SHOULD BE IGNORED 712

START DMO TOOL USING DETAILS OF CONFIGURATION OF IN-MEMORY DATABASE 714

PERFORM DMO UPTIME PROCESSING 716

CREATE SYNONYMS FOR SELECTED DATA STRUCTURES 718

CREATE PRIMARY KEYS FOR SELECTED DATA STRUCTURES 719

BEGIN DOWNTIME PORTION OF DMO 726

SUCCESSFUL REPLICATION? 722

Y

N

BEGIN INITIAL LOAD AND REPLICATE SELECTED DATA STRUCTURES 720

MIGRATE REMAINING APPLICATION DATA SUTRUTRES 728

REPORT ERROR 724

SUCCESSFUL MIGRATION? 730

Y

START NEW SYSTEM ON TARGET IN-MEMORY DATABASE 734

N

ROLLBACK MIGRATION 732

*FIG. 7*

REDUCED DOWNTIME FOR DATABASE MIGRATION TO IN-MEMORY DATABASE

TECHNICAL FIELD

This document generally relates to in-memory databases. More specifically, this document relates to reduced downtime for database migration to an in-memory database.

BACKGROUND

An in-memory database (also known as an in-memory database management system) is a type of database management system that primarily relies on main memory for computer data storage. It is contrasted with database management systems that employ a disk storage mechanism. In-memory databases are traditionally faster than disk storage databases because disk access is slower than memory access. One example in-memory database is the HANA® database from SAP SE, of Walldorf, Germany.

BRIEF DESCRIPTION OF DRAWINGS

The present disclosure is illustrated by way of example and not limitation in the figures of the accompanying drawings, in which like references indicate similar elements.

FIG. 4 is a diagram illustrating at a high-level the process behind database migration using a software update manager, in accordance with an example embodiment.

FIG. 7 is a flow diagram illustrating a method for migrating data from a non-in-memory database to an in-memory database, in accordance with an example embodiment.

DETAILED DESCRIPTION

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

When an entity such as a company or organization wishes to migrate their database from a non-in-memory database to an in-memory database, there is a period of time that the database must be inaccessible to users (this is known as downtime). This downtime is caused by the need to perform specialized tasks to convert to an in-memory database, and in some cases also upgrade and/or convert the software that utilizes the database at the same time. This can be harmful to user satisfaction, especially for mission critical enterprise applications.

In some embodiments, the migration from a non-in-memory database to an in-memory database is performed using a specialized portion of a software update manager (SUM). This specialized portion is a toolset called a database migration option (DMO). What is needed is a solution that allows the DMO to perform the migration with as little downtime as possible. This can be challenging technologically.

In an example embodiment, a solution is provided that selects a portion of the non-in-memory database to migrate prior to the DMO performing the downtime portion of the migration. While it is typically not possible for the entire database to be migrated prior to the downtime portion, due to the need for certain portions of the database to be used for the DMO portion itself, a substantial portion of the non-in memory database can be migrated prior to the DMO performing the downtime portion of the migration by using specialized techniques, which will be described in more detail below. By migrating a substantial portion of the database prior to the downtime portion, this reduces the size of the portion of the database that needs to be migrated during the downtime portion, thus substantially reducing the length of time needed for the downtime portion.

Figure 1:
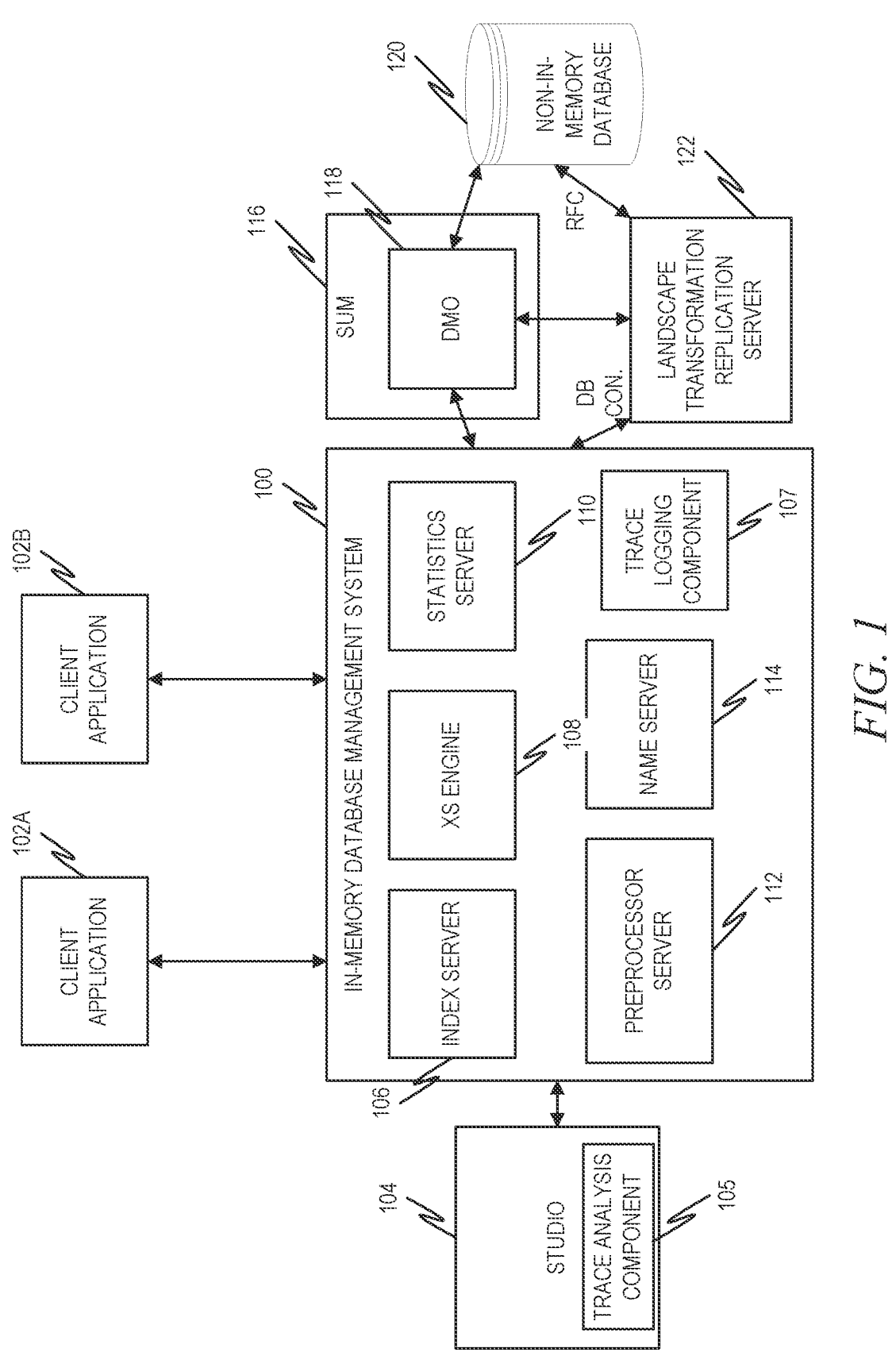
FIG. 1 is a diagram illustrating an in-memory database management system, including its client/external connection points, which can be kept stable in the case of disaster recovery to ensure stable service operations, in accordance with an example embodiment.

FIG. 1 is a diagram illustrating an in-memory database management system 100, including its client/external connection points, which can be kept stable in the case of disaster recovery to ensure stable service operations, in accordance with an example embodiment. It should be noted that one of ordinary skill in the art will recognize that sometimes an in-memory database management system 100 is also referred to as an in-memory database. Here, the in-memory database management system 100 may be coupled to one or more client applications 102A, 102B. The client applications 102A, 102B may communicate with the in-memory database management system 100 through a number of different protocols, including Structured Query Language (SQL), Multidimensional Expressions (MDX), Hypertext Transfer Protocol (HTTP), REST, and Hypertext Markup Language (HTML).

Also depicted is a studio 104, used to perform modeling or basic database access and operations management by accessing the in-memory database management system 100. The studio may include a trace analysis component 105 utilized to request tracing be performed by the in-memory database management system 100 and analyze trace logs. As will be described in more detail below, this trace analysis component 105 may, in an example embodiment, be designed to perform mining and detangling operations on trace data stored in trace data files. The trace data files may be written to by a trace logging component 107 on the in-memory database management system 100. More particularly, the trace analysis component 105 may instruct the trace logging component 107 to log certain items executed by the in-memory database management system 100. This logging may include tracking a thread identification, connection identification, transaction identification, time stamp, trace level, component, and source file for groups (threads)

of items, along with a copy of the items themselves, and then writing this information to one or more trace files.

The trace analysis component 105 may then perform mining and detangling of the trace file(s). This mining and detangling process will be described in more detail below.

The in-memory database management system 100 may comprise a number of different components, including an index server 106, an XS engine 108, a statistics server 110, a preprocessor server 112, and a name server 114. These components may operate on a single computing device, or may be spread among multiple computing devices (e.g., separate servers).

The index server 106 contains the actual data and the engines for processing the data. It also coordinates and uses all the other servers.

The XS engine 108 allows clients to connect to the in-memory database management system 100 using web protocols, such as HTTP.

The statistics server 110 collects information about status, performance, and resource consumption from all the other server components. The statistics server 110 can be accessed from the studio 104 to obtain the status of various alert monitors.

The preprocessor server 112 is used for analyzing text data and extracting the information on which text search capabilities are based.

The name server 114 holds information about the database topology. This is used in a distributed system with instances of the database on different hosts. The name server 114 knows where the components are running and which data is located on which server.

Also depicted is a SUM 116, which contains a DMO 118 used to migrate data from a non-in-memory database 120 to the in-memory database management system 100. In an example embodiment, the DMO 118 utilizes a landscape transformation replication server 122 to reduce the amount of downtime required to migrate the data.

Figure 2:
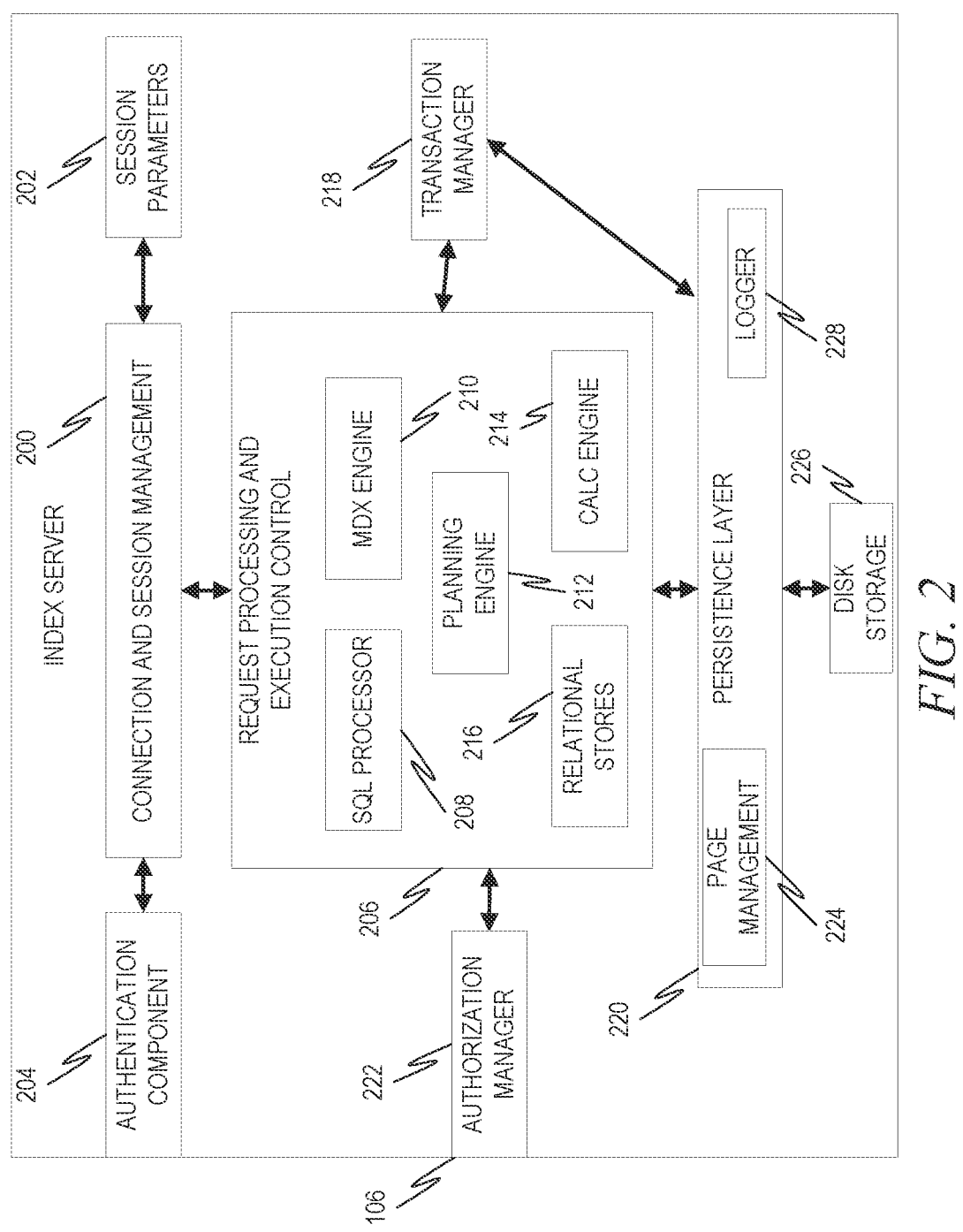
FIG. 2 is a diagram illustrating an index server, in accordance with an example embodiment.

FIG. 2 is a diagram illustrating an index server 106, in accordance with an example embodiment. Specifically, the index server 106 of FIG. 1 is depicted in more detail. The index server 106 includes a connection and session management component 200, which is responsible for creating and managing sessions and connections for the database clients. Once a session is established, clients can communicate with the database system using SQL statements. For each session, a set of session parameters 202 may be maintained, such as auto-commit, current transaction isolation level, and so forth. Users (e.g., system administrators, developers) may be authenticated by the database system itself (e.g., by logging in with user name and password, using an authentication component 204), or authentication can be delegated to an external authentication provider such as a Lightweight Directory Access Protocol (LDAP) directory.

The client requests can be analyzed and executed by a set of components summarized as request processing and execution control 206. An SQL processor 208 checks the syntax and semantics of the client SQL statements and generates a logical execution plan. MDX are a language for querying and manipulating multidimensional data stored in online analytical processing (OLAP) cubes. As such, an MDX engine 210 is provided to allow for the parsing and executing of MDX commands. A planning engine 212 allows applications (e.g., financial planning applications) to execute basic planning operations in the database layer. One such operation is to create a new version of a dataset as a copy of an existing dataset, while applying filters and transformations.

A calc engine 214 implements the various SQL script and planning operations. The calc engine 214 creates a logical execution plan for calculation models derived from SQL scripts, MDX, planning, and domain-specific models. This logical execution plan may include, for example, breaking up a model into operations that can be processed in parallel.

The data is stored in relational stores 216, which implement a relational database in main memory.

Each SQL statement may be processed in the context of a transaction. New sessions are implicitly assigned to a new transaction. A transaction manager 218 coordinates database transactions, controls transactional isolation, and keeps track of running and closed transactions. When a transaction is committed or rolled back, the transaction manager 218 informs the involved engines about this event so they can execute needed actions. The transaction manager 218 also cooperates with a persistence layer 220 to achieve atomic and durable transactions.

An authorization manager 222 is invoked by other database system components to check whether the user has the specified privileges to execute the requested operations. The database system allows for the granting of privileges to users or roles. A privilege grants the right to perform a specified operation on a specified object.

The persistence layer 220 ensures that the database is restored to the most recent committed state after a restart and that transactions are either completely executed or completely undone. To achieve this goal in an efficient way, the persistence layer 220 uses a combination of write-ahead logs, shadow paging, and save points. The persistence layer 220 also offers a page management interface 224 for writing and reading data to and from a separate disk storage 226, and also contains a logger 228 that manages the transaction log. Log entries can be written implicitly by the persistence layer 220 when data is written via the persistence interface or explicitly by using a log interface.

Figure 3:
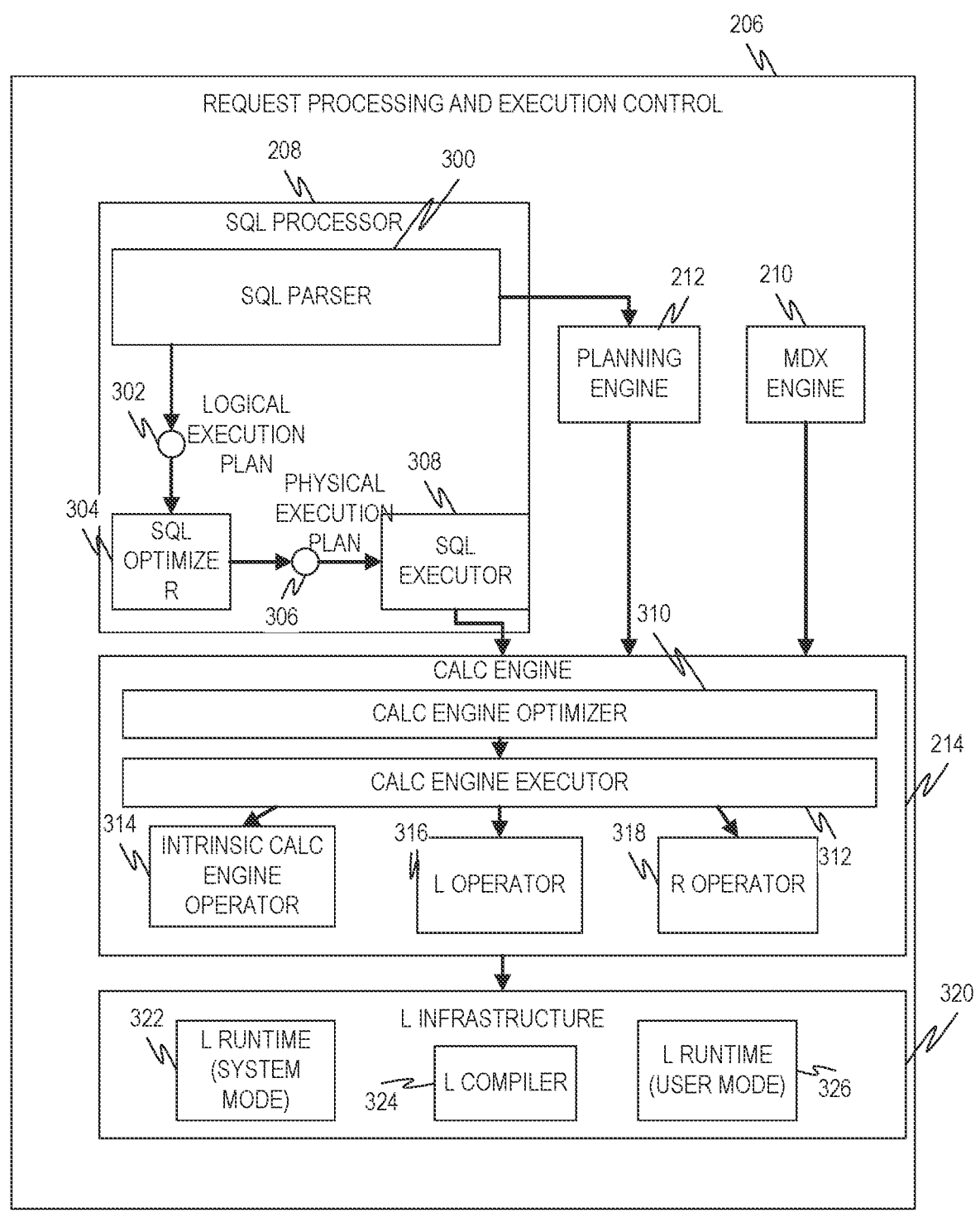
FIG. 3 is a diagram illustrating a request processing and execution control, in accordance with an example embodiment.

FIG. 3 is a diagram illustrating a request processing and execution control 206, in accordance with an example embodiment. This diagram depicts the request processing and execution control 206 of FIG. 2 in more detail. The SQL processor 208 contains an SQL parser 300, which parses an SQL statement and generates a logical execution plan 302, which it passes to an SQL optimizer 304. The SQL optimizer 304 then optimizes the logical execution plan 302 and converts it to a physical execution plan 306, which it then passes to an SQL executor 308. The calc engine 214 implements the various SQL script and planning operations, and includes a calc engine optimizer 310, which optimizes the operations, and a calc engine executor 312, which executes the operations, as well as an intrinsic calc engine operator 314, an L operator 316, and an R operator 318.

An L infrastructure 320 includes a number of components to aid in the running of L procedures, including an L-runtime (system mode) 322, an L compiler 324, and an L-runtime (user mode) 326.

Figure 4:
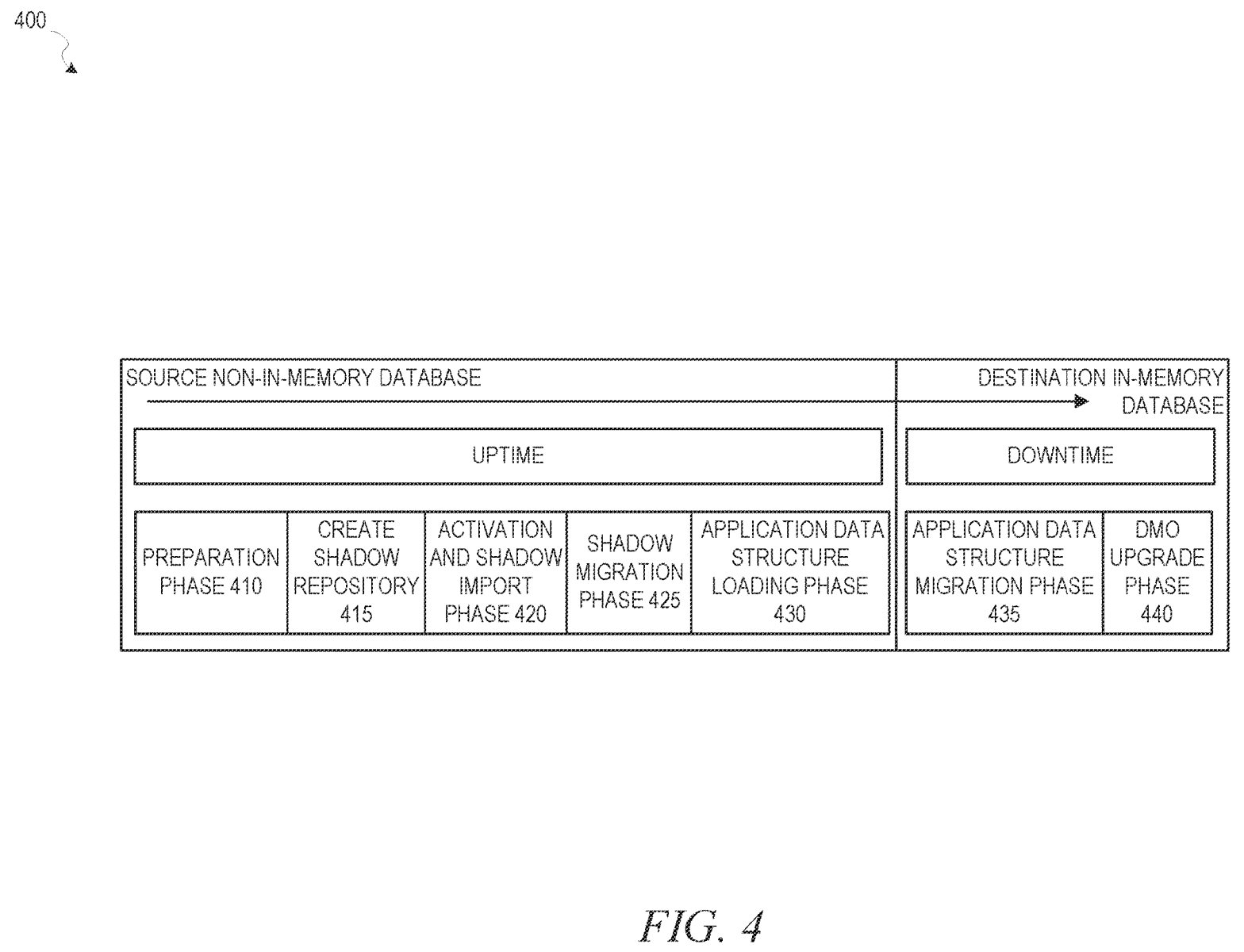

FIG. 4 is a diagram 400 illustrating at a high-level the process behind database migration using a software update manager, in accordance with an example embodiment. The DMO feature allows for in-place migration from a source non-in-memory database to a target in-memory database in one tool. A further benefit of the DMO feature is that has a fast reset functionality, provided that the source database remains consistent throughout the procedure.

The processing sequence is based on a shadow system functionality of the SUM. In this diagram, "uptime" processing means that the system and the database are still running and end users can work productively with the system, while downtime processing means that either the system or the database (or both) are not still running and end users cannot work productively with the system.

In a preparation phase 410, a range of checks is automatically made to ensure that the migration process proceeds smoothly. In an example embodiment, included in this preparation phase 410 is the selection of particular data structures (e.g., tables) from the source database to migrate during the uptime portion. These tables may be selected with large in size information from the source database for the landscape transformation replication server 122. By selecting larger data structures, this helps relieve some of the load of the migration that will need to take place during the downtime portion. The landscape transformation replication server 122 contains a tool that loads and replicates data in real-time or schedules such replication for later. The landscape transformation replication server 122 uses a trigger-based replication approach to pass data from the source non-in-memory database to the target in-memory database management system. The triggers may be created by, for example, a remote function call (RFC) on the source non-in-memory database. Thus, the connection between the landscape transformation replication server 122 and the source non-in-memory database may be an RFC connection, while the connection between the landscape transformation replication server 122 and the sidecar may be a database connection.

When a data structure, such as a table, is replicated, the landscape transformation replication server 122 creates logging tables in the source non-in-memory database. Further, a read module for the source data is created in the source non-in-memory database.

After creating logging tables and triggers for selected data structures for uptime migration in the source non-in-memory database using the landscape transformation replication server 122, the DMO may be told to ignore those selected data structures. In an example embodiment, the DMO is told to ignore those selected data structures by identifying the selected data structures (such as by listing table names) with a particular parameter in a configuration file of the DMO. The parameter tells the DMO to ignore the corresponding data structure with the matching name.

In a shadow instance phase 415, the SUM creates a shadow repository, which may form a basis of a shadow system on the non-in-memory database until the downtime portion. This shadow system may be used while the in-memory database is set up. The shadow system can be used for various update activities while the original system is used in production operation. The SUM builds up the shadow system by cloning parts of the original system.

In an activation and shadow import phase 420, the shadow system is used to perform a modification adjustment of programming language dictionary objects and an activation of new programming language dictionary objects that are part of the update. Additionally, the shadow import itself may be performed, writing directly into shadow data structures in the shadow system.

In a shadow migration phase 425, the shadow system is migrated to the target in-memory database. Since the entire system is still in the uptime portion, users may continue to utilize the system while this migration is going on. During the migration, the shadow repository is migrated to the target in-memory database. Since the target data structures are created without application data, the result is that the target data structures are available at the target in-memory database without corresponding application data. Additionally, in the case of tables, the primary keys are not available for tables which were created at the target in-memory database. Only the shadow instance data structures are loaded with data and the remaining application tables are empty.

In an application data structure data loading phase 430, data structure application data is loaded into the target in-memory database using triggers created by the tool in the landscape transformation replication server 122. After performing an initial load, the data structures are automatically set for the replication. With the triggers, the changes are captured in the logging tables and transferred to the target in-memory database via replication.

The procedure then proceeds to the downtime portion, where end users are shut out from using the system. When the users are logged out of the system, this downtime portion can begin. Before start of the downtime portion, checks may be performed to ensure that all open activities of the users are processed. Remaining delta changes of logging tables are processed in this phase and final verification of data structures from the landscape transformation replication server 122 is performed. Once the final checks are performed, an application data structure migration phase 435 can begin. In this phase, the remaining data structures not migrated during the uptime portion are migrated to the target in-memory database. This process may actually be performed by a pair of tools, with one for the export-side and one for the import-side. The export-side tool and the import-side tool can share data using, for example, memory pipes or an export dump in file format. In a DMO upgrade phase 440, a repository and kernel switchover can take place, where the system connection is switched from the source non-in-memory database to the target in-memory database, as well as the main import and execution of records after the main import, and operations such as adoptions of structures to a new software release, data model conversions, and so forth.

Figure 5:
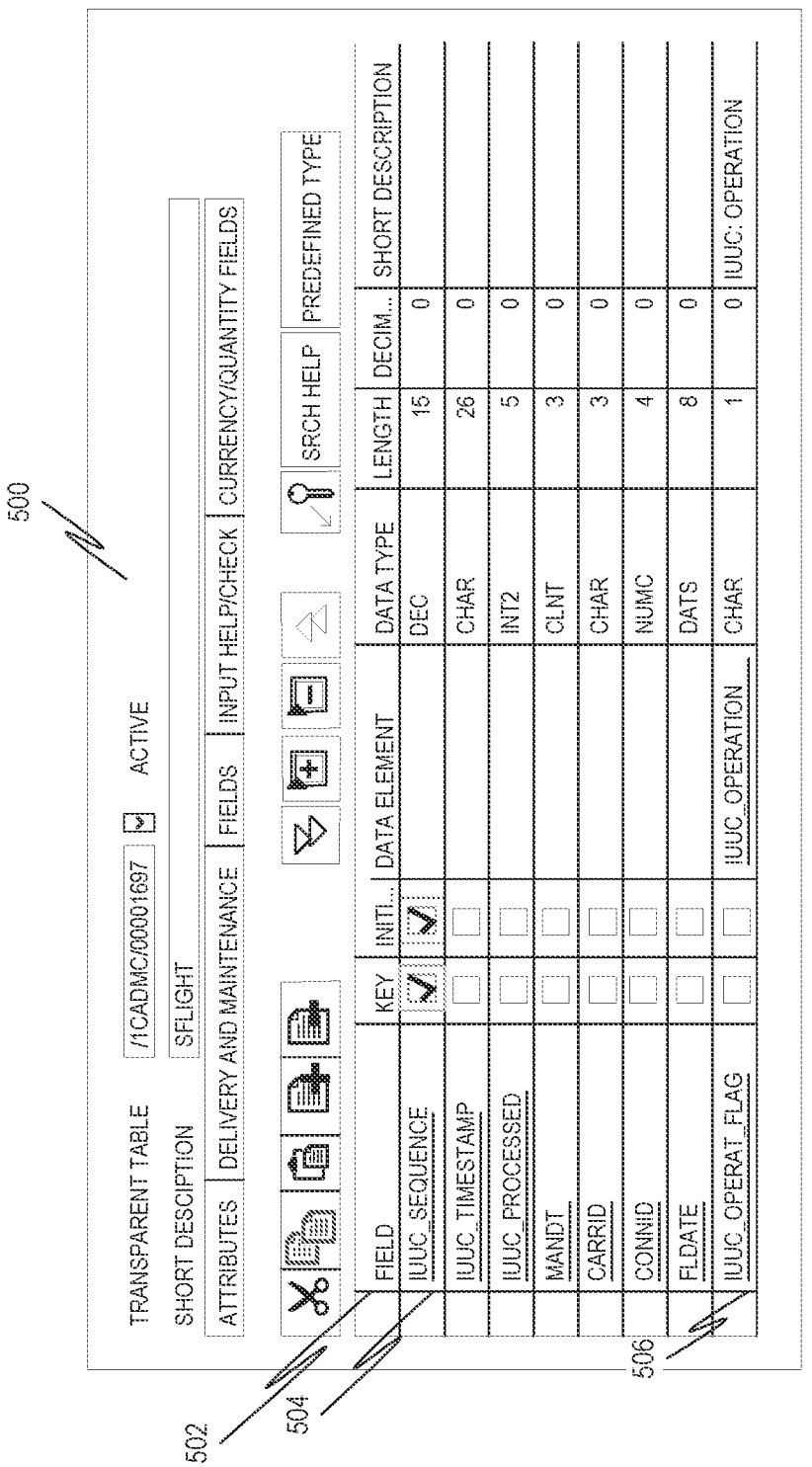
FIG. 5 is a diagram illustrating a structure for a logging table, in accordance with an example embodiment.

FIG. 5 is a diagram illustrating a structure 500 for a logging table, in accordance with an example embodiment. Note the structure 500 is not the logging table itself, as the structure 500 is depicted in a graphical user interface allowing for the addition, deletion, or modification of various fields 502, each of which may be a column in the logging table. Here, as can be seen, among other columns, a time-stamp column 504 and an operation column 506 have been defined.

Figure 6:
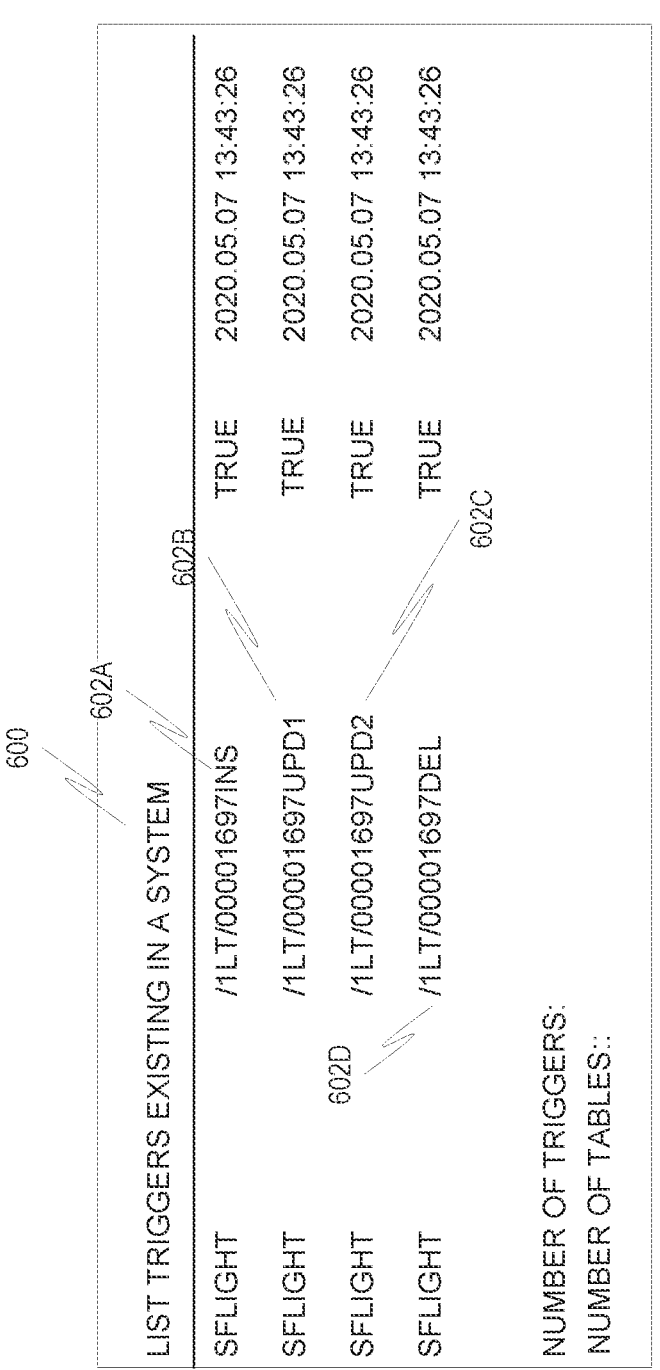
FIG. 6 is a diagram illustrating a list of triggers defined in a system, in accordance with an example embodiment.

FIG. 6 is a diagram illustrating a list 600 of triggers defined in a system, in accordance with an example embodiment. Here, the list 600 include four triggers 602A-602D. Trigger 602A captures insert operations. Trigger 602B captures a first update operation. Trigger 602C captures a second update operation. Trigger 602D captures delete operations. One or more of these triggers may be used for each data structure, such as a table, to be migrated during the update portion of the presently described process.

FIG. 7 is a flow diagram illustrating a method 700 for migrating data from a non-in-memory database to an in-memory database, in accordance with an example embodiment. At operation 702, one or more data structures are identified for uptime migration. These are data structures in the source non-in-memory database that can be migrated during the uptime portion. While there is no set requirement for how many of these data structures can be identified during this operation, it is often beneficial to at least select the largest data structures in the non-in-memory database, as these larger data structures offer the most benefit in terms of savings of downtime of the system for the number of data structures chosen. It should also be noted that there are some data structures in the source non-in memory database that are either unable to be identified for uptime migration or are undesirable to do so, and should be handled in downtime migration instead. These include system tables for which creating a corresponding trigger is not possible or is difficult, such as system tables used to resolve dependencies during migration or data structures being continuously updated.

At operation 704, one or more optimization parameters in the landscape transformation replication server are updated for the selected data structures to optimize the initial load. When an initial load is started, several access plans are generated for the selected data structures. These access plans can run in parallel. In order to determine whether the initial load for a data structure can be handled by several load jobs in parallel, one can utilize a tool on the landscape transformation replication server that examines the format and content of each data structure and indicates whether each can be handled using parallel processing. There are also performance and additional settings controlled by system tables on the landscape transformation replication server that can be updated based on the selected data structures. The goal of operation 704 is to make the processing of the migration of the selected data structures as efficient as possible.

At operation 706, a sidecar configuration scenario is created by the landscape transformation replication server. This sidecar configuration scenario essentially adds the one or more data structures identified for uptime migration as a sidecar to the target-in-memory database. A sidecar is a secondary database to an already existing system with its own primary database. The non-in-memory database replicates its data into the sidecar via a secondary database connection that is established to run reports. The landscape transformation replication server is capable of performing real-time data replication for this purpose. Once the data is replicated, users may perform actions, such as running reports, directly from the in-memory database via a secondary database connection instead of from the non-in-memory database. At this operation, the configuration may be tested and verified to be operational.

At operation 708, one or more triggers and logging tables are created for the identified data structures. At operation 710, the DMO tool of the SUM is extracted for use. At operation 712, a list of data structures maintained by the SUM is modified to indicate that the selected data structures should be ignored.

At operation 714, the DMO tool is started using details of the configuration of the in-memory database. At operation 716, DMO uptime processing is performed. Preprocessing includes various operations, including shadow system creation, activation of the new repository, and shadow import, followed by shadow system migration to the in-memory database along with target data structure creations (without application data). During this process, the data structures created by the landscape transformation replication server are overwritten by the DMO.

At operation 718, synonyms for selected data structures are created. This process involves providing names of the selected data structures in the database connection language that map to the corresponding names in the RFC. These synonyms are used during the migrations and then cleaned up (removed) once migration is complete. At operation 719, primary keys are created for the selected data structures. At operation 720, the initial load is begun and the selected data structures are replicated using the landscape transformation replication server. The whole process is monitored by the landscape transformation replication server. At operation 722, it is determined if the replication was successful. If not, then at operation 724, an error is reported and the method 700 loops back to operation 720 to try again and/or complete replication. If so, then at operation 726, a downtime portion of the DMO is begun. At operation 728, the remaining application data structures (not the selected ones) are migrated. Once this has been completed, then at operation 730, it is determined whether this migration is successful. During this process, the source non-in-memory database continues to run and application data in it are not modified, so it remains a fallback if necessary. As such, if it is determined at operation 730 that migration was not successful, at operation 732, rollback may occur. If the migration was successful, however, then at operation 734, the new system is started on the target in-memory database and resumed to users for normal activities.

EXAMPLES

Example 1. A system comprising:
  at least one hardware processor; and
  a non-transitory computer-readable medium storing instructions that, when executed by the at least one hardware processor, cause the at least one hardware processor to perform operations comprising:
    identifying one or more data structures in a non-in-memory database for uptime migration to an in-memory database;
    creating a sidecar configuration scenario for the in-memory database;
    creating one or more triggers for the identified one or more data structures in a sidecar associated with the sidecar configuration scenario;
    performing uptime migration processing by executing the one or more triggers to load the identified one or more data structures into the sidecar while the in-memory database remains available for access to users;
    marking the identified one or more data structures in a file maintained by a software update manager with a notation indicating that the identified one or more data structures should be ignored;
    executing a database migration option of the software update manager to perform downtime migration processing by loading any data structures other than the identified one or more data structures from the non-in-memory database into the sidecar while the in-memory database is not available for access to users, based on the file maintained by the software update manager; and
    causing the sidecar to be utilized as the in-memory database.

Example 2. The system of Example 1, wherein communication between the non-in-memory database and the software update manager is performed via remote function calls (RFCs) and the creating of the one or more triggers is performed using one or more of the RFCs.

Example 3. The system of either of Examples 1-2, wherein communication between the software update manager and the sidecar is performed via a database connection and the performing of the uptime migration processing is performed using the database connection.

Example 4. The system of any of Examples 1-3, wherein the executing includes the database migration option accessing the file maintained by the software update manager and loading any data structures not marked with the notation indicating that they should be ignored from the in-memory database into the sidecar.

Example 5. The system of any of Examples 1-4, wherein the identified one or more data structures do not include any data structures that are continuously updated.

Example 6. The system of any of Examples 1-5, wherein the identified one or more data structures do not include any data structures that are system data structures necessary to process the one or more triggers.

Example 7. The system of any of Examples 1-6, wherein the identified one or more data structures are application tables.

Example 8. A method comprising:

identifying one or more data structures in a non-in-memory database for uptime migration to an in-memory database;

creating a sidecar configuration scenario for the in-memory database;

creating one or more triggers for the identified one or more data structures in a sidecar associated with the sidecar configuration scenario;

performing uptime migration processing by executing the one or more triggers to load the identified one or more data structures into the sidecar while the in-memory database remains available for access to users;

marking the identified one or more data structures in a file maintained by a software update manager with a notation indicating that the identified one or more data structures should be ignored;

executing a database migration option of the software update manager to perform downtime migration processing by loading any data structures other than the identified one or more data structures from the non-in-memory database into the sidecar while the in-memory database is not available for access to users, based on the file maintained by the software update manager; and causing the sidecar to be utilized as the in-memory database.

Example 9. The method of Example 8, wherein communication between the non-in-memory database and the software update manager is performed via remote function calls (RFCs) and the creating of the one or more triggers is performed using one or more of the RFCs.

Example 10. The method of either of Examples 8-9, wherein communication between the software update manager and the sidecar is performed via a database connection and the performing of the uptime migration processing is performed using the database connection.

Example 11. The method of any of Examples 8-10, wherein the executing includes the database migration option accessing the file maintained by the software update manager and loading any data structures not marked with the notation indicating that they should be ignored from the in-memory database into the sidecar.

Example 12. The method of any of Examples 8-11, wherein the identified one or more data structures do not include any data structures that are continuously updated.

Example 13. The method of any of Examples 8-12, wherein the identified one or more data structures do not include any data structures that are system data structures necessary to process the one or more triggers.

Example 14. The method of any of Examples 8-13, wherein the identified one or more data structures are application tables.

Example 15. A non-transitory machine-readable medium storing instructions which, when executed by one or more processors, cause the one or more processors to perform operations comprising:

identifying one or more data structures in a non-in-memory database for uptime migration to an in-memory database;

creating a sidecar configuration scenario for the in-memory database;

creating one or more triggers for the identified one or more data structures in a sidecar associated with the sidecar configuration scenario;

performing uptime migration processing by executing the one or more triggers to load the identified one or more data structures into the sidecar while the in-memory database remains available for access to users;

marking the identified one or more data structures in a file maintained by a software update manager with a notation indicating that the identified one or more data structures should be ignored;

executing a database migration option of the software update manager to perform downtime migration processing by loading any data structures other than the identified one or more data structures from the non-in-memory database into the sidecar while the in-memory database is not available for access to users, based on the file maintained by the software update manager; and causing the sidecar to be utilized as the in-memory database.

Example 16. The non-transitory machine-readable medium of Example 15, wherein communication between the non-in-memory database and the software update manager is performed via remote function calls (RFCs) and the creating of the one or more triggers is performed using one or more of the RFCs.

Example 17. The non-transitory machine-readable medium of either of Examples 15 or 16, wherein communication between the software update manager and the sidecar is performed via a database connection and the performing of the uptime migration processing is performed using the database connection.

Example 18. The non-transitory machine-readable medium of any of Examples 15-17, wherein the executing includes the database migration option accessing the file maintained by the software update manager and loading any data structures not marked with the notation indicating that they should be ignored from the in-memory database into the sidecar.

Example 19. The non-transitory machine-readable medium of any of Examples 15-18, wherein the identified one or more data structures do not include any data structures that are continuously updated.

Example 20. The non-transitory machine-readable medium of any of Examples 15-19, wherein the identified one or more data structures do not include any data structures that are system data structures necessary to process the one or more triggers.

Figure 8:
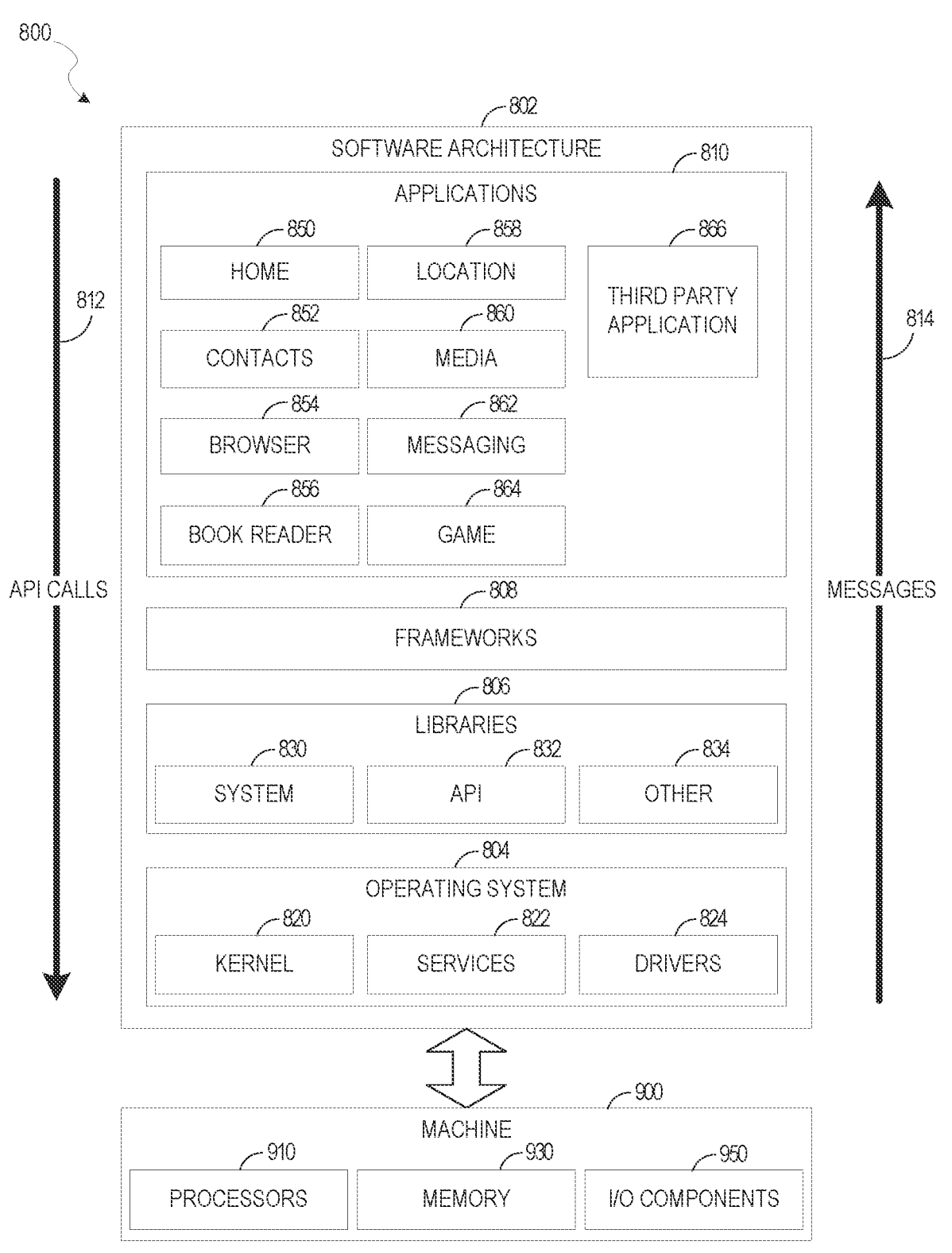
FIG. 8 is a block diagram illustrating an architecture of software, which can be installed on any one or more of the devices described above.

FIG. 8 is a block diagram 800 illustrating a software architecture 802, which can be installed on any one or more of the devices described above. FIG. 8 is merely a non-limiting example of a software architecture, and it will be appreciated that many other architectures can be implemented to facilitate the functionality described herein. In various embodiments, the software architecture 802 is implemented by hardware such as a machine 900 of FIG. 9 that includes processors 910, memory 930, and input/output (I/O) components 950. In this example architecture, the software architecture 802 can be conceptualized as a stack of layers where each layer may provide a particular functionality. For example, the software architecture 802 includes layers such as an operating system 804, libraries 806, frameworks 808, and applications 810. Operationally, the applications 810 invoke API calls 812 through the software stack and receive messages 814 in response to the API calls 812, consistent with some embodiments.

In various implementations, the operating system 804 manages hardware resources and provides common services. The operating system 804 includes, for example, a kernel 820, services 822, and drivers 824. The kernel 820 acts as an abstraction layer between the hardware and the other software layers, consistent with some embodiments. For example, the kernel 820 provides memory management, processor management (e.g., scheduling), component management, networking, and security settings, among other functionality. The services 822 can provide other common services for the other software layers. The drivers 824 are responsible for controlling or interfacing with the underlying hardware, according to some embodiments. For instance, the drivers 824 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 806 provide a low-level common infrastructure utilized by the applications 810. The libraries 806 can include system libraries 830 (e.g., C standard library) that can provide functions such as memory allocation functions, string manipulation functions, mathematic functions, and the like. In addition, the libraries 806 can include API libraries 832 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in 2D and 3D in a graphic context on a display), database libraries (e.g., SQLite to provide various relational database functions), web libraries (e.g., WebKit to provide web browsing functionality), and the like. The libraries 806 can also include a wide variety of other libraries 834 to provide many other APIs to the applications 810.

The frameworks 808 provide a high-level common infrastructure that can be utilized by the applications 810, according to some embodiments. For example, the frameworks 808 provide various graphical user interface (GUI) functions, high-level resource management, high-level location services, and so forth. The frameworks 808 can provide a broad spectrum of other APIs that can be utilized by the applications 810, some of which may be specific to a particular operating system 804 or platform.

In an example embodiment, the applications 810 include a home application 850, a contacts application 852, a browser application 854, a book reader application 856, a location application 858, a media application 860, a messaging application 862, a game application 864, and a broad assortment of other applications, such as a third-party application 866. According to some embodiments, the applications 810 are programs that execute functions defined in the programs. Various programming languages can be employed to create one or more of the applications 810, structured in a variety of manners, such as object-oriented programming languages (e.g., Objective-C, Java, or C++) or procedural programming languages (e.g., C or assembly language). In a specific example, the third-party application 866 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 866 can invoke the API calls 812 provided by the operating system 804 to facilitate functionality described herein.

Figure 9:
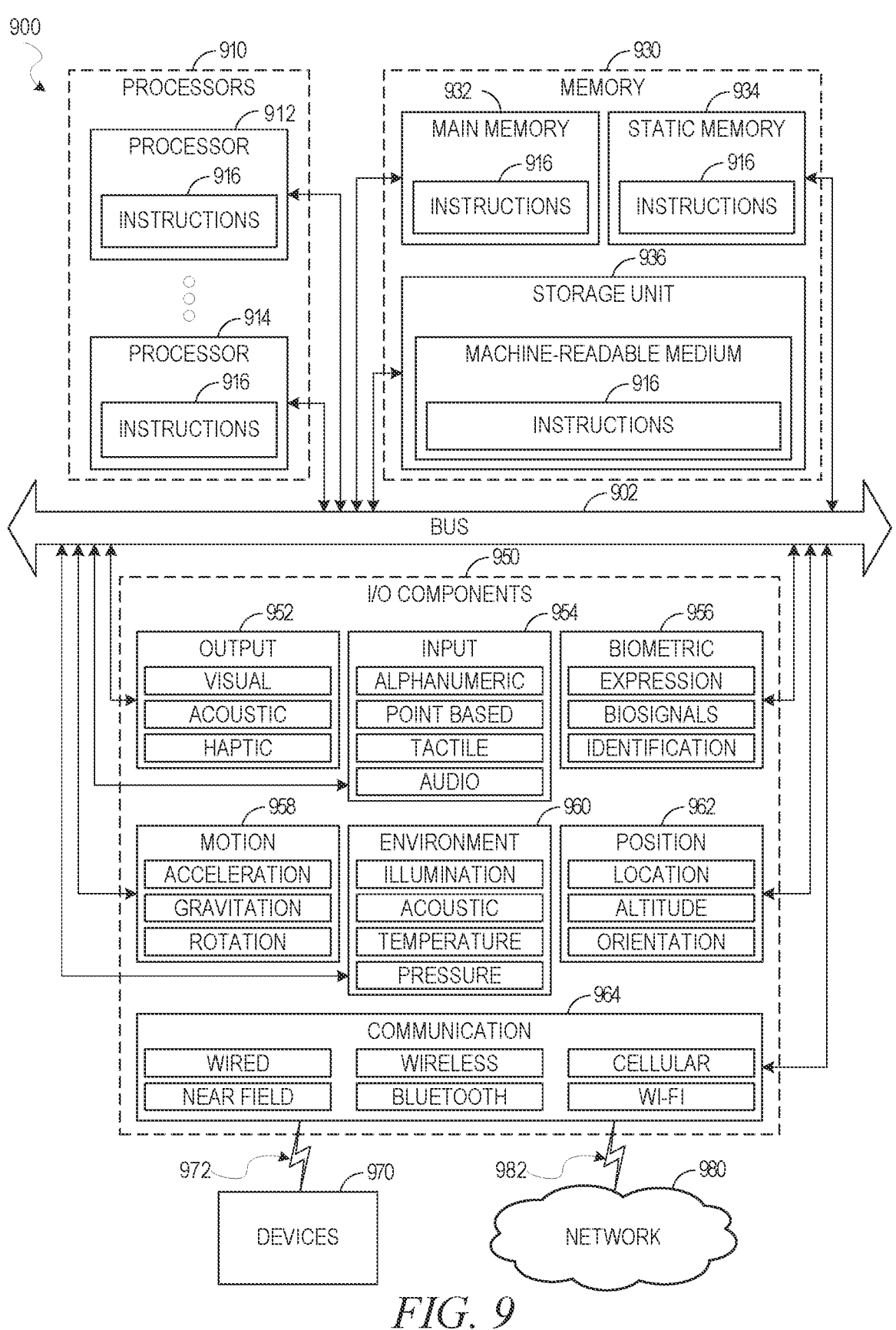
FIG. 9 illustrates a diagrammatic representation of a machine in the form of a computer system within which a set of instructions may be executed for causing the machine to perform any one or more of the methodologies discussed herein, according to an example embodiment.

FIG. 9 illustrates a diagrammatic representation of a machine 900 in the form of a computer system within which a set of instructions may be executed for causing the machine 900 to perform any one or more of the methodologies discussed herein, according to an example embodiment. Specifically, FIG. 9 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein may be executed. For example, the instructions 916 may cause the machine 900 to execute the methods of FIG. 7. Additionally, or alternatively, the instructions 916 may implement FIGS. 1-7 and so forth. The instructions 916 transform the general, non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

The machine 900 may include processors 910, memory 930, and I/O components 950, which may be configured to communicate with each other such as via a bus 902. In an example embodiment, the processors 910 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 912 and a processor 914 that may execute the instructions 916. The term "processor" is intended to include multi-core processors that may comprise two or more independent processors (sometimes referred to as "cores") that may execute instructions 916 contemporaneously. Although FIG. 9 shows multiple processors 910, the machine 900 may include a single processor 912 with a single core, a single processor 912 with multiple cores (e.g., a multi-core processor 912), multiple processors 912, 914 with a single core, multiple processors 912, 914 with multiple cores, or any combination thereof.

The memory 930 may include a main memory 932, a static memory 934, and a storage unit 936, each accessible to the processors 910 such as via the bus 902. The main memory 932, the static memory 934, and the storage unit 936 store the instructions 916 embodying any one or more of the methodologies or functions described herein. The instructions 916 may also reside, completely or partially, within the main memory 932, within the static memory 934, within the storage unit 936, within at least one of the processors 910 (e.g., within the processor's cache memory), or any suitable combination thereof, during execution thereof by the machine 900.

The I/O components 950 may include a wide variety of components to receive input, provide output, produce output, transmit information, exchange information, capture measurements, and so on. The specific I/O components 950 that are included in a particular machine will depend on the type of machine. For example, portable machines such as mobile phones will likely include a touch input device or other such input mechanisms, while a headless server machine will likely not include such a touch input device. It will be appreciated that the I/O components 950 may include many other components that are not shown in FIG. 9. The I/O components 950 are grouped according to functionality merely for simplifying the following discussion, and the grouping is in no way limiting. In various example embodiments, the I/O components 950 may include output components 952 and input components 954. The output components 952 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 954 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 950 may include biometric components 956, motion components 958, environmental components 960, or position components 962, among a wide array of other components. For example, the biometric components 956 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 958 may include acceleration sensor components (e.g., accelerometer), gravitation sensor components, rotation sensor components (e.g., gyroscope), and so forth. The environmental components 960 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 962 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 950 may include communication components 964 operable to couple the machine 900 to a network 980 or devices 970 via a coupling 982 and a coupling 972, respectively. For example, the communication components 964 may include a network interface component or another suitable device to interface with the network 980. In further examples, the communication components 964 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 970 may be another machine or any of a wide variety of peripheral devices (e.g., coupled via a USB).

Moreover, the communication components 964 may detect identifiers or include components operable to detect identifiers. For example, the communication components 964 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 964, such as location via Internet Protocol (IP) geolocation, location via Wi-Fi® signal triangulation, location via detecting an NFC beacon signal that may indicate a particular location, and so forth.

The various memories (i.e., 930, 932, 934, and/or memory of the processor(s) 910) and/or the storage unit 936 may store one or more sets of instructions 916 and data structures (e.g., software) embodying or utilized by any one or more of the methodologies or functions described herein. These instructions (e.g., the instructions 916), when executed by the processor(s) 910, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 980 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi®& network, another type of network, or a combination of two or more such networks. For example, the network 980 or a portion of the network 980 may include a wireless or cellular network, and the coupling 982 may be a Code Division Multiple Access (CDMA) connection, a Global System for Mobile communications (GSM) connection, or another type of cellular or wireless coupling. In this example, the coupling 982 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 916 may be transmitted or received over the network 980 using a transmission medium via a network interface device (e.g., a network interface component included in the communication components 964) and utilizing any one of a number of well-known transfer protocols (e.g., HTTP). Similarly, the instructions 916 may be transmitted or received using a transmission medium via the coupling 972 (e.g., a peer-to-peer coupling) to the devices 970. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 916 for execution by the machine 900, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
at least one hardware processor; and
a non-transitory computer-readable medium storing instructions that, when executed by the at least one hardware processor, cause the at least one hardware processor to perform operations comprising:
identifying one or more data structures in a non-in-memory database for uptime migration to an in-memory database;
creating a sidecar configuration scenario for the in-memory database;
creating one or more triggers, using remote function calls (RFCs) for the identified one or more data structures in a sidecar associated with the sidecar configuration scenario and communicating the one or more triggers from the non-in-memory database to a software update manager via the RFCs;
performing uptime migration processing, using the software update manager, by executing the one or more triggers to load the identified one or more data structures into the sidecar, via a database connection and not via RFCs, while the in-memory database remains available for access to users;
marking the identified one or more data structures in a file maintained by the software update manager with a notation indicating that the identified one or more data structures has already been migrated and therefore should not be migrated again during downtime migration processing;
executing a database migration option of the software update manager to perform downtime migration processing by loading any data structures other than the identified one or more data structures from the non-in-memory database into the sidecar while the in-memory database is not available for access to users, based on the file maintained by the software update manager; and
causing the sidecar to be utilized as the in-memory database.

2. The system of claim 1, wherein communication between the software update manager and the sidecar is performed via a database connection and the performing of the uptime migration processing is performed using the database connection.

3. The system of claim 1, wherein the executing includes the database migration option accessing the file maintained by the software update manager and loading any data structures not marked with the notation indicating that they should be ignored from the in-memory database into the sidecar.

4. The system of claim 1, wherein the identified one or more data structures do not include any data structures that are continuously updated.

5. The system of claim 1, wherein the identified one or more data structures do not include any data structures that are system data structures necessary to process the one or more triggers.

6. The system of claim 1, wherein the identified one or more data structures are application tables.

7. A method comprising:

identifying one or more data structures in a non-in-memory database for uptime migration to an in-memory database;

creating a sidecar configuration scenario for the in-memory database;

creating one or more triggers, using remote function calls (RFCs) for the identified one or more data structures in a sidecar associated with the sidecar configuration scenario and communicating the one or more triggers from the non-in-memory database to a software update manager via the RFCs;

performing uptime migration processing, using the software update manager, by executing the one or more triggers to load the identified one or more data structures into the sidecar, via a database connection and not via RFCs, while the in-memory database remains available for access to users;

marking the identified one or more data structures in a file maintained by the software update manager with a notation indicating that the identified one or more data structures has already been migrated and therefore should not be migrated again during downtime migration processing;

executing a database migration option of the software update manager to perform downtime migration processing by loading any data structures other than the identified one or more data structures from the non-in-memory database into the sidecar while the in-memory database is not available for access to users, based on the file maintained by the software update manager; and causing the sidecar to be utilized as the in-memory database.

8. The method of claim 7, wherein communication between the software update manager and the sidecar is performed via a database connection and the performing of the uptime migration processing is performed using the database connection.

9. The method of claim 7, wherein the executing includes the database migration option accessing the file maintained by the software update manager and loading any data structures not marked with the notation indicating that they should be ignored from the in-memory database into the sidecar.

10. The method of claim 7, wherein the identified one or more data structures do not include any data structures that are continuously updated.

11. The method of claim 7, wherein the identified one or more data structures do not include any data structures that are system data structures necessary to process the one or more triggers.

12. The method of claim 7, wherein the identified one or more data structures are application tables.

13. A non-transitory machine-readable medium storing instructions which, when executed by one or more processors, cause the one or more processors to perform operations comprising:

identifying one or more data structures in a non-in-memory database for uptime migration to an in-memory database;

creating a sidecar configuration scenario for the in-memory database;

creating one or more triggers, using remote function calls (RFCs) for the identified one or more data structures in a sidecar associated with the sidecar configuration scenario and communicating the one or more triggers from the non-in-memory database to a software update manager via the RFCs;

performing uptime migration processing, using the software update manager, by executing the one or more triggers to load the identified one or more data structures into the sidecar, via a database connection and not via RFCs, while the in-memory database remains available for access to users;

marking the identified one or more data structures in a file maintained by the software update manager with a notation indicating that the identified one or more data structures has already been migrated and therefore should not be migrated again during downtime migration processing;

executing a database migration option of the software update manager to perform downtime migration processing by loading any data structures other than the identified one or more data structures from the non-in-memory database into the sidecar while the in-memory database is not available for access to users, based on the file maintained by the software update manager; and causing the sidecar to be utilized as the in-memory database.

14. The non-transitory machine-readable medium of claim 13, wherein communication between the software update manager and the sidecar is performed via a database connection and the performing of the uptime migration processing is performed using the database connection.

15. The non-transitory machine-readable medium of claim 13, wherein the executing includes the database migration option accessing the file maintained by the software update manager and loading any data structures not marked with the notation indicating that they should be ignored from the in-memory database into the sidecar.

16. The non-transitory machine-readable medium of claim 13, wherein the identified one or more data structures do not include any data structures that are continuously updated.

17. The non-transitory machine-readable medium of claim 13, wherein the identified one or more data structures do not include any data structures that are system data structures necessary to process the one or more triggers.

18. The system of claim 1, wherein the performing uptime migration includes storing changes to the non-in-memory database in one or more logging tables and transferring the changes from the one or more logging tables to the sidecar using the database connection.

19. The system of claim 1, wherein the one or more triggers are used for each data structure in the non-in-memory database.

* * * * *